US008628857B2

(12) United States Patent
Simovich

(10) Patent No.: US 8,628,857 B2
(45) Date of Patent: Jan. 14, 2014

(54) BALLISTIC PLATE AND METHOD OF FABRICATION THEREOF

(76) Inventor: Gigi Simovich, Savyon (IL)

( * ) Notice: Subject to any disclaimer, the term of this patent is extended or adjusted under 35 U.S.C. 154(b) by 785 days.

(21) Appl. No.: 12/387,649

(22) Filed: May 5, 2009

(65) Prior Publication Data

US 2010/0077911 A1 Apr. 1, 2010

(30) Foreign Application Priority Data

May 5, 2008 (IL) .......................................... 191258

(51) Int. Cl.
*F41H 5/02* (2006.01)
*C04B 37/00* (2006.01)
*B32B 37/06* (2006.01)

(52) U.S. Cl.
USPC ........... 428/446; 428/621; 428/327; 428/632; 428/641; 428/469; 428/472.2; 428/698; 428/702; 89/36.02; 89/36.05; 89/903; 89/908; 89/910; 89/912; 89/917

(58) Field of Classification Search
None
See application file for complete search history.

(56) References Cited

U.S. PATENT DOCUMENTS

| | | | | |
|---|---|---|---|---|
| 3,616,115 A | * | 10/1971 | Klimmek | 109/84 |
| 3,874,855 A | * | 4/1975 | Legrand | 428/550 |
| 5,361,678 A | * | 11/1994 | Roopchand et al. | 89/36.02 |
| 5,686,689 A | * | 11/1997 | Snedeker et al. | 89/36.02 |
| 6,289,781 B1 | * | 9/2001 | Cohen | 89/36.02 |
| 6,408,734 B1 | * | 6/2002 | Cohen | 89/36.02 |
| 6,413,640 B1 | * | 7/2002 | Hanzawa et al. | 428/408 |
| 6,863,759 B2 | * | 3/2005 | Richmond et al. | 156/92 |
| 7,685,922 B1 | * | 3/2010 | Martin et al. | 89/36.02 |
| 7,833,627 B1 | * | 11/2010 | Ferrando | 428/416 |
| 7,866,248 B2 | * | 1/2011 | Moore et al. | 89/36.02 |
| 2003/0092558 A1 | * | 5/2003 | Aghajanian | 501/91 |
| 2003/0161750 A1 | * | 8/2003 | Moxson et al. | 419/2 |
| 2007/0160825 A1 | * | 7/2007 | Miyakawa et al. | 428/312.2 |
| 2009/0145289 A1 | * | 6/2009 | Cohen | 89/36.02 |
| 2010/0071537 A1 | * | 3/2010 | Weber et al. | 89/36.02 |

FOREIGN PATENT DOCUMENTS

| | | | | |
|---|---|---|---|---|
| GB | 2 276 934 | * | 10/1994 | F41H 5/04 |
| GB | 2 336 807 | * | 11/1999 | F41H 5/04 |
| WO | WO2008055468 A | * | 5/2008 | |

* cited by examiner

*Primary Examiner* — David Sample
(74) *Attorney, Agent, or Firm* — Robert G. Lev

(57) ABSTRACT

A composite material plate comprising a plurality of hard ceramic stubs with silicon rich metal inclusions in a metal-ceramic, heterogeneous poly-phase matrix and a method of fabrication thereof comprising the steps of fabricating green ceramic stubs; densifying; optionally wrapping carbon fibers therearound and arranging the green ceramic stubs into a closely packed array with organic binder, pyrrolizing and Impregnating a silicon based metal matrix by reactive sintering.

9 Claims, 4 Drawing Sheets

BALLISTIC PLATE AND METHOD OF FABRICATION THEREOF

PRIORITY INFORMATION

The present invention claims priority to Israeli Patent Application No. IL191258, filed on May 5, 2008, making reference hereto and incorporating same in its entirety.

FIELD OF THE INVENTION

The present invention relates to composite materials and more particularly to anti-ballistic armor plates.

BACKGROUND OF THE INVENTION

Since earliest times, warriors protected themselves with armor. The age of chivalry ended with the development of firearms, but an improved understanding of materials has led to the developments has led to body armor capable of stopping bullets. Multiple layers of Kevlar have proved effective at stopping low velocity pistol bullets and even rifle bullets at long range. For stopping high velocity projectiles such as those fired by an M-16 or Kalashnikov result rifle, ceramic and composite plates are required. These are typically built into vests to protect the vital organs in the chest, and are used by soldiers and law enforcement agencies.

The prior art describes various methods to increase the effectiveness of ceramic components in armor. For example, US Patent Application No. 2005217471 by Benitsch titled "Ceramic antiballistic layer, process for producing the layer and protective device having the layer" describes a ceramic antiballistic layer which can be produced as a large-area, optionally curved component that is able to withstand a multi-hit attack from over a short distance. The ceramic antiballistic layer has a continuous outer surface facing the attack, whereas a surface which faces away from the attack has a segmented structure. Processes for producing such a layer and a protective device having the layer are also provided.

U.S. Pat. No. 5,972,819 to Cohen titled "Ceramic bodies for use in composite armor" describes a ceramic body for use in a composite armor panel. It comprises a cylindrical shape body with at least one convexly curved end face with a specific ratio of body diameter to radius of curvature.

The effectiveness of ceramic body armor depends on the velocity and mass of the projectile, the angle of impact and its behavior on impact. There is a continuous need for more effective materials for use in ceramic body armor. Reduction in weight, increased stopping power and ability to withstand multiple impacts are desirable. There is a need for more effective materials and fabrication and the present invention addressed this need.

SUMMARY OF THE INVENTION

In a first aspect, embodiments of the present invention are directed to a composite plate comprising a plurality of hard ceramic stubs within a silicon rich metal/ceramic matrix.

Typically, the matrix is a poly-phase matrix comprising an amalgam or alloy that substantially comprises silicon.

Typically the pores within the ceramic stubs contain a silicon rich metal phase.

Optionally, the matrix further includes at least one material selected from the list consisting Aluminum, Titanium, Iron, Boron, Nickel, Carbon and Copper.

Optionally and typically the ceramic phase comprises boron carbide, alpha-phase silicon carbide, titanium boride and carbon fiber.

In some embodiments, the ceramic stubs either have cross-sections have shapes selected from the list of: squares, triangles and hexagons and the stubs tessellate to form a continuous surface.

In other embodiments, the or the ceramic stubs have cross sections having shapes selected from the list of cylinders and prism-like shapes and the stubs are tiled together in a close packed array, such that stubs are bonded together at points of contact to form a surface.

Optionally, each stub is coated with a carbon rich coil like structure.

Optionally, the ceramic stubs are prisms have an aspect ratio in the range of from between 0.7 and 1.6.

Optionally, the composite plate further comprises a backing plate comprising at least a first ply of substantially continuous fibers in the plane of the plate.

A second aspect of the invention is directed to providing a method of fabricating a composite plate comprising the steps of: fabricating green ceramic stubs; densifying; arranging the green ceramic stubs into a closely packed array; adding a silicon based metal, and reactive sintering.

In some embodiments, the green ceramic stubs are carbon coated.

Optionally, a coil of carbon fiber is fabricated and a green ceramic stub is formed by filling the coil with ceramic powder or sludge.

Alternatively, a green stub is first fabricated and then carbon fiber is coiled therearound.

In some embodiments, the green ceramic stubs are triangular, quadrilateral or hexagonal and tessellate together to cover a surface substantially without gaps.

Alternatively, the ceramic stubs are substantially cylindrical or prism-shaped, and are fitted together in a substantially hexagonal closed packed arrangement.

Typically, the ceramic comprises at least one of the materials selected from the list of Boron Carbide, Boron Nitride, alpha-phase Silicon Carbide, Titanium Boride and Carbon fiber.

Typically, the substantially metal matrix comprises Silicon.

Optionally the substantially metal matrix further comprises additional materials selected from the list of Aluminum, Titanium, Iron, Boron, Nickel, Carbon and Copper.

Optionally, the green ceramic includes an organic binder and densification includes baking at a temperature of several hundred degrees centigrade to pyrolize the organic binder.

Typically, the reactive sintering comprises heating to a temperature of at least 1400° C. under vacuum. Most typically, the reactive sintering comprises heating to a temperature of 1550° C. to 1650° C. under vacuum.

In some embodiments, the method further comprises adding at least one layer of substantially continuous fibers in a unidirectional array or weave to at least one side of the plate of stubs.

In some embodiments, the method further comprises adding a backing layer of ductile material selected from the list of aluminum and silicon.

The term prism-like shape as used herein refers to solids of constant cross-sectional shape with respect to cross sections taken perpendicular to a longitudinal direction or thickness. Such prisms may be extruded through a die.

The perimeter of the prism like shape may include curved or straight segments and typically the top and bottom may be flat or gently rounded.

Thickness is the dimension through the plate. Lateral dimensions relate to within the plane of the plate.

The term 'green' as used herein, covers both the extruded/pressure formed stubs and the stubs after the first pyrolizing heat treatment.

DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF PREFERRED EMBODIMENTS

Figure 1:
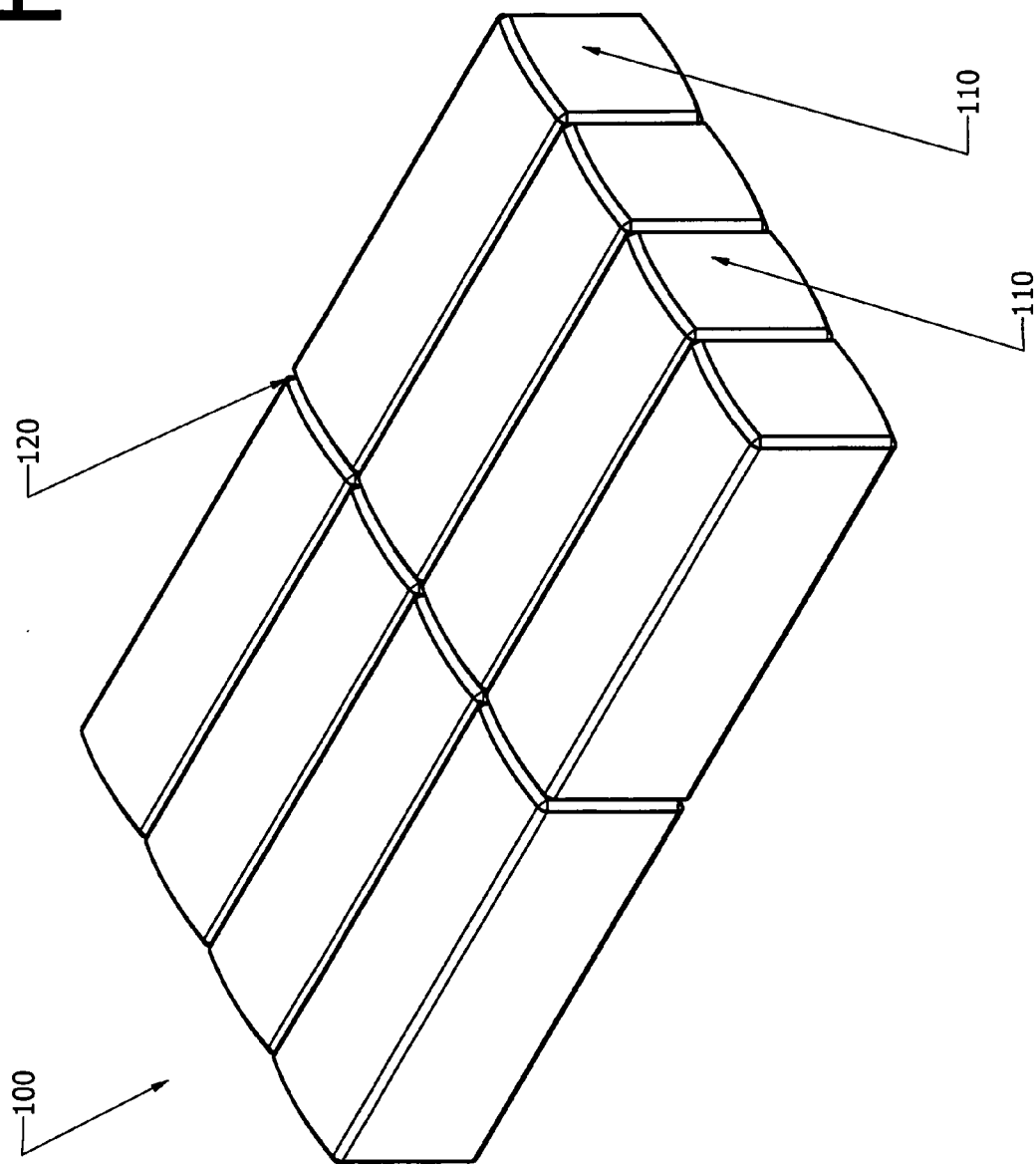
FIG. 1 is a perspective view of a consolidated metal matrix ceramic metal composite plate that may be used in armor plating for persons or vehicles, comprising a plurality of prism-like sub-member or stub bound together by a ceramic material.

It has been found that certain sintered ceramic materials may be densified by infiltration of silicon. Silicon has also been found effective in reactively bonding different ceramic elements together.

An aspect of the invention relates to a composite plate-like structure consisting of a plurality of ceramic stubs or tiles bound together by a silicon metal matrix. The silicon metal matrix may react with excess carbon to form SiC inclusions. Green ceramic stubs are formed by pressing composite powders together, often using an organic liquid as a binder. Heating to several hundred degrees centigrade, burns off, evaporates or pyrolizes the binder and causes further densification. This first heat treatment stage may be effected under vacuum or at room pressure, preferably in inert atmosphere and essentially pyrolyzes the binder and carbon fibers where present, but results in a porous structure within the green stub. The green stubs may be packed and optionally attached to each other with a binder that may be a starch or sugar solution, or an adhesive such as an epoxy, in a two dimensional array, and silicon may be added thereto. Sintering at temperatures exceeding about 1400° C. and preferably of around 1600° C. results in the silicon reactively binding the stubs together along joining edges and causes silicon infiltration into the pores of the stubs.

Relatively large ceramic plates may be reactive bonded in this manner. It has surprisingly been found that the interface between the ceramic stubs and the silicon matrix generally has a high ballistic impact absorption efficiency compared to other bonding means such as epoxies, whereas the ballistic efficiency of the ceramic stubs themselves is essentially not altered by the bonding.

It is an aim of the invention to provide a consolidated ceramic in silicon armor plate with enhanced ballistic efficiency by reactively bonding together a plurality of ceramic sub-members having specific dimensional characteristics.

Since the stubs may be arranged in a flat plate or to cover a more complex surface, and the overall dimensions are merely limited by the size of the over, composite ballistic impact withstanding material or 'armor' may be fabricated for using as inserts to cover vital organs in bullet proof vests, or in helmets, or as ballistic plating for vehicles and the like.

The stubs may have a variety of forms. If triangular, quadrilateral or hexagonal, they may be arranged to cover surfaces without spaces therebetween. Cylindrical or other prism like shapes may be arranged in a staggered, close packed arrangement. The stubs may be formed in a closed mold or continuously extruded. Other shapes such as substantially spherical particles may also be used. Silicon is both light weight and ductile and has been found to form a suitable matrix. The silicon may include other metals dissolved therein, or carbon and may leach other elements from the ceramic stubs.

Although a very wide range of shapes are possible, to optimize the ballistic efficiency of the plates formed therefrom, the ceramic stubs or tiles preferably have specific dimensional shapes, having aspect ratios of in plane minimum direction to thickness of between 0.7 and 1.6; i.e. wherein at least one of their lateral dimensions is in the range 0.7 to 1.6 times their thickness. It will be appreciated that this is in contradistinction to continuous fiber composites which have very different aspect ratios.

Where orthogonal lateral dimensions are both in the said range with respect to the thickness, for armor plating designed to protect against light firearms, and having a ceramic layer thickness of 8 to 25 mm, the projected area of each individual sub-member on a plane parallel to the local armor surface is in the range 0.4 to 16 square centimeters.

The sub-members are packed side by side laterally in each layer. In some embodiments separate layers may be arranged in a plurality of layers, one in front of the other, for example, thereby obtaining thicker armor components.

Post sintering, gaps or open cavities between or within the consolidated sub-members may be filled by impregnation of a polymer binder or with a ductile light metal or alloy, such as an aluminum alloy.

In one preferred embodiment of this invention multiple reaction bonded Silicon Carbide cylindrical sub-members with one curved end face are closely packed in one layer wherein the curved end face is positioned at the strike face side of the layer, each cylindrical surface is in contact with six adjacent sub-member cylindrical surfaces and is bonded to them with a thin layer of a reaction bonded Silicon Carbide.

The thin bonding layer is positioned at the contact line of the cylindrical surfaces. The multiple consolidated sub-members are formed into a single Silicon Carbide monolith member with cavities by reaction bonding.

In some embodiments, the sub-members themselves may be formed by compacting ceramic powder with a Carbon source and a binder. The Ceramic powder need not be silicon carbide and may comprise any combination or all of: Boron Carbide, alpha-phase Silicon Carbide, Titanium Boride, Carbon fiber or other Ceramic powder that is known to have high hardness and can be infiltrated with Silicon without adverse reaction.

Fabrication by forming stubs and then sintering them together in this manner is cost-effective since the compaction of small ceramic articles requires a relatively small capital investment in molds and machine presses and assures cost effectiveness and modular production methods. For example many different ceramic member shapes can be made using a single sub-member form.

The sub-members may also be fabricated as green ceramics by extrusion.

After the green ceramic sub-members are formed, they are closely packed in a mold to form a continuous layer and are bonded to each other with a binding material that comprises silicon, and possibly carbon.

The binding material may have the same composition as the sub-members. But since it is preferable for the sub-members to be highly compacted to achieve high ceramic loading in the green state, it is unlikely to obtain identical microstructure in the pressed pre-form and the binding material.

The binding material used for fabricating the stubs preferably comprises a binder that leaves a carbon residue when pyrolyzed, for example: Novolac epoxy resin, phenol resin, starch, sugars. Alternatively, a wetting agent or binder that fully evaporates, such as an alcohol or water may be used to bind the ceramic particles in the green ceramic.

Optionally, the binding material includes Silicon Carbide and/or Boron Carbide and charcoal.

The green sub-members may be partially or totally embedded in the binding material.

In one embodiment, a composite envelope containing non oxide ceramic fibers or carbon fibers is positioned around the sub-members.

The composite envelope preferably comprises a ceramic or metal matrix; the carbon fibers are previously coated with a protective barrier precursor material of glassy Carbon or Silicon Carbide. This is known to form a barrier between the carbon fiber and melted metal at the infiltration stage. Phenol resin for example is a precursor of glassy carbon.

SMP-10 resin made by Starfire systems inc. Malta N.Y. USA is an example of a precursor of Silicon Carbide that may be used as the matrix material.

Carbon wrapped ceramic stubs followed by silicon infiltration and pyrolization significantly improves the anti ballistic properties of the stubs. These improved stubs may be consolidated into plates by being stuck together with epoxy in a second manufacturing stage.

Alternatively, The stubs may be adhered together by a starch or sugar solution which causes reaction bonding on pyrolysis.

In a method of making the ceramic plate, the closely packed bonded tiles or stubs are pyrolyzed at a temperature within the approximate range of 600° C. to 900° C. in an inert atmosphere to form a consolidated porous ceramic pre-form member that includes Carbon.

The member is placed on a graphite tray that was previously coated with a Boron Nitride layer. Silicon lumps are put in contact with the porous member and the loaded tray is put into a vacuum furnace. The furnace is evacuated and heated to approximately 1500° C. to 1600° C. The Silicon melts and infiltrates the porous member to react with the Carbon to form extra Silicon Carbide and to fill the pores in the pre-form.

To improve wetting of certain ceramics, dissolving appropriate metal ions into the silicon has been found to be useful.

Various metals have some solubility in silicon. These include Aluminum, Titanium, Iron, Boron, Nickel, Carbon and Copper, small quantities of any or a mixture of several of these can be dissolved in the Silicon to obtain desired physical properties of the composite ceramic and to alter the infiltration temperature.

In fabrication, the furnace is maintained at the infiltration temperature for about two hours after which it is powered off and allowed to cool to room temperature.

The consolidated composite ceramic member is heterogeneous. Vickers or Knoop indentation microhardness may be used for quality assurance purposes. It has been found that regions within the sub-member are harder than the matrix and normally comprises lower metallic Silicon phase level than in the region connecting the stubs which is essentially binding material. The interface between the two regions has been found to be an efficient crack deflector and has high acoustic compatibility, which is a property important for achieving multi impact resistance capability.

It will be appreciated that although the ceramic composite members may be coated with metallic droplets and inclusions, the inner order and relative dimensional relation between the composite regions is maintained.

This reduces the need to remove the inclusions and may enable the use of the member as obtained.

With reference to FIG. 1, a consolidated ceramic reinforced metal matrix composite plate 100 is shown. The plate 100 comprises a plurality of prism-like sub-members or stubs 110 bound together by a metal matrix 120. Since the stubs 110 are oblong and tessellate fully, the metal matrix merely wets the surfaces thereof.

It will be appreciated that fabricating dense stubs is relatively easy, since even small presses can create considerable pressure on a small area. By careful alignment and bonding together such stubs 110, a large plate may be formed. Consolidated ceramic reinforced metal matrix composite plate may be used in armor plating for persons or vehicles. Such a plate 100 may have substantially any dimensions and may be flat, or shaped on a former, to correspond to a part of the human anatomy, such as part of the head for use in a helmet for example.

Figure 2:
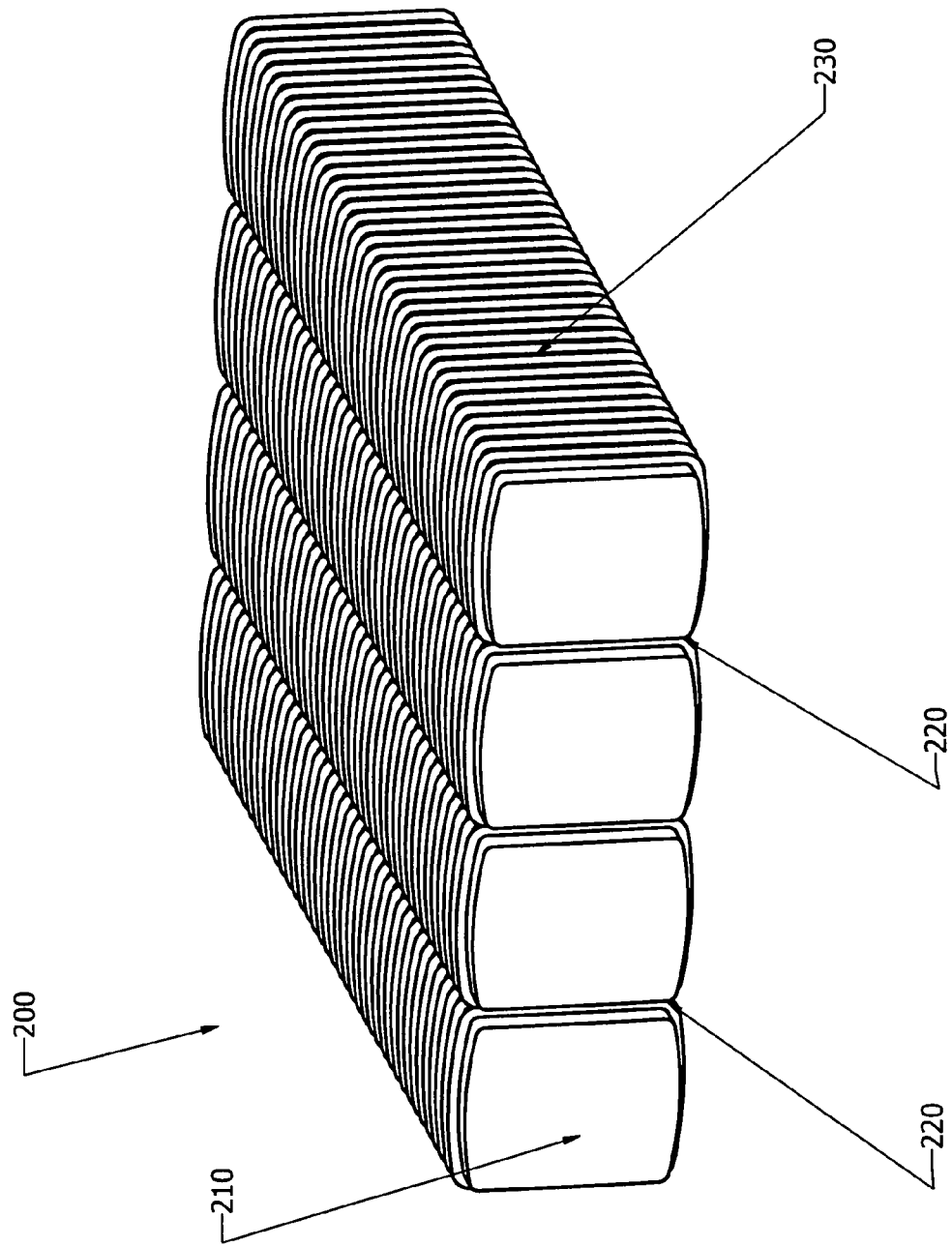
FIG. 2 is a perspective view of a consolidated metal matrix composite plate for anti-ballistic armor applications in accordance with a second embodiment, wherein each ceramic prism-like stub is enveloped in carbon fiber and the enveloped stubs are impregnated with silicon.

With reference to FIG. 2, a consolidated metal matrix composite plate 200 in accordance with a second embodiment is shown. In second embodiment, each ceramic prism-like stub 210 is enveloped in carbon fiber 230 and the enveloped stubs 230 are then impregnated with silicon 220 to consolidate by filling pores and to bind the stubs 210 together.

In another embodiment, the green stubs of ceramic are fabricated within a fiber envelope containing carbon fiber or ceramic fibers, either by winding the fibers around the green ceramic or by winding a coil of fiber around a mandrel and filling with ceramic powder prior to densification. The carbon fibers may be pre-coated with a protective barrier precursor material such as glassy Carbon or Silicon Carbide. The coil wound ceramic may then be silicon bonded and silicon infiltrated as above. In an alternative fabrication method, carbon fibers may be wound around the green stub or tile and a protective barrier precursor or binder may be added by dipping the sub-member in a liquid resin. In yet another method of forming the Carbon fiber containing envelope; green sub-members pre-form are positioned in a hollow Carbon fiber reinforced shape that comprises a matrix made of a resin that is a precursor of glassy Carbon or precursor of Silicon carbide.

There is not enough experimental evidence to confirm the hypothesis, but there are indications that this variant fabrication technology increases the impact resistance of the individual stubs.

Once the individual carbon fiber wound green stubs are fabricated, they may be closely packed and bonded by pyrolysis at a temperature within the range of 600° C. to 900° C. in an inert atmosphere to form a consolidated, porous ceramic member that includes carbon.

The consolidated member or plate is placed on a graphite tray that was previously coated with a Boron Nitride layer. Silicon lumps are put in contact with the porous member and the loaded tray is put into a vacuum furnace. The furnace is evacuated and heated to about 1500° C. to 1600° C. The silicon melts and infiltrates the porous member to react with the Carbon to form extra Silicon Carbide, to fill the pores in the perform and to bond the Carbon fibers in a metal and ceramic matrix.

The Furnace is typically maintained at the infiltration temperature for about two hours after which it is powered off and allowed to cool to room temperature.

Once sintered, the matrix becomes partially ceramic and pores within the ceramic stubs become impregnated with metal. Nevertheless, the consolidated composite ceramic member or plate is heterogeneous and the microstructure includes a number of distinct regions. Regions related to the stub are normally harder and have less metallic silicon than regions related to the binding material. With reference to FIG. 2, the region that relates to the carbon envelope comprises carbon fiber bonded by a hard ceramic-metal matrix. With careful selection of ceramic materials, beneficiary residual stresses within the consolidated member may be obtained that enhance the ballistic resistance properties. Prestressing the carbon fibers may enhance this effect.

Figure 3:
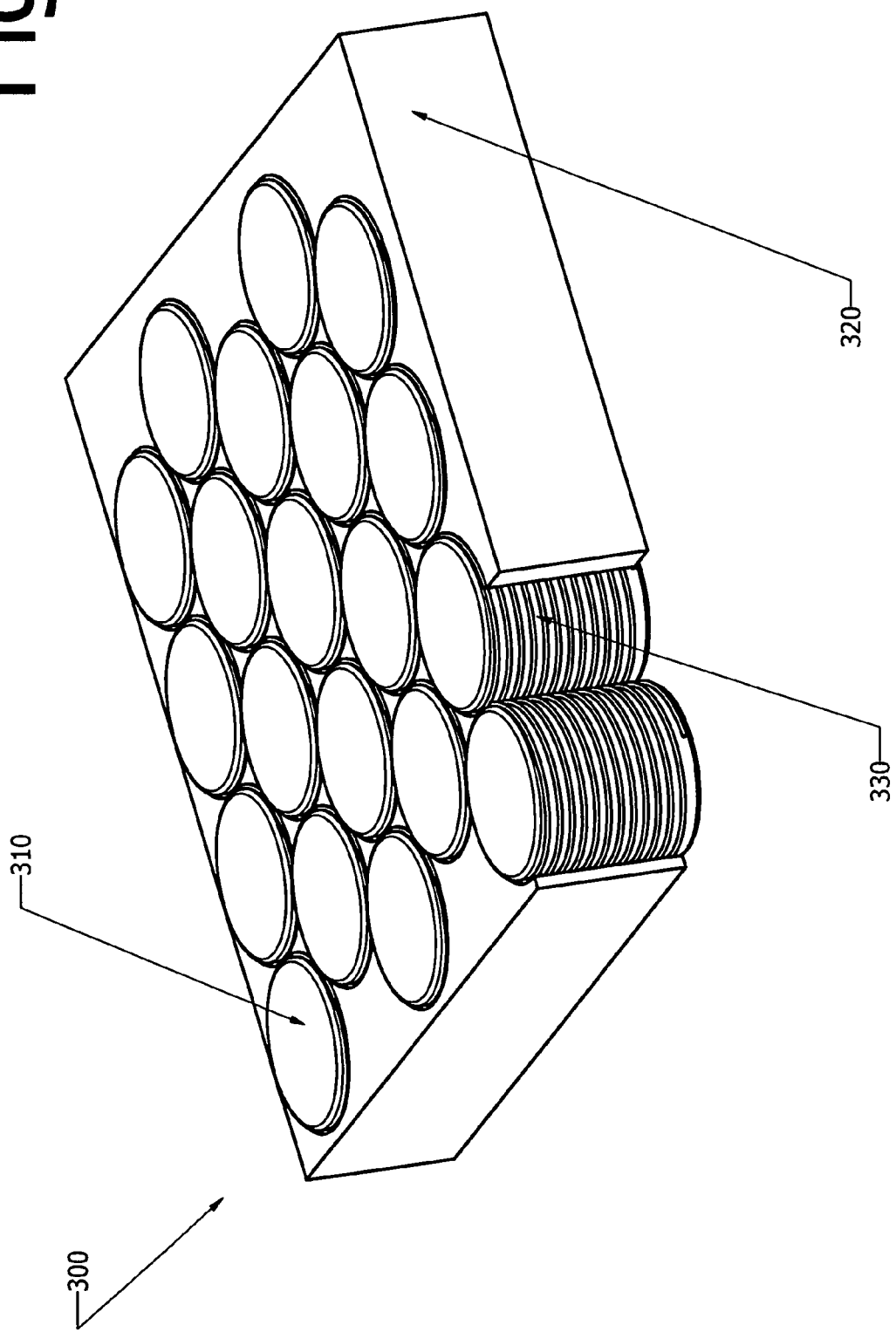
FIG. 3 is a perspective broken view of a consolidated ceramic metal composite armor member comprising a plurality of cylindrical sub-members or stubs enveloped in carbon fibers and consolidated with a silicon based binder material.

FIG. 3 is a perspective broken view of a consolidated ceramic in metal matrix composite plate 300 comprising a plurality of cylindrical sub-members or stubs 310 enveloped in carbon fibers 330 and consolidated with a silicon based binder material 320.

Figure 4:
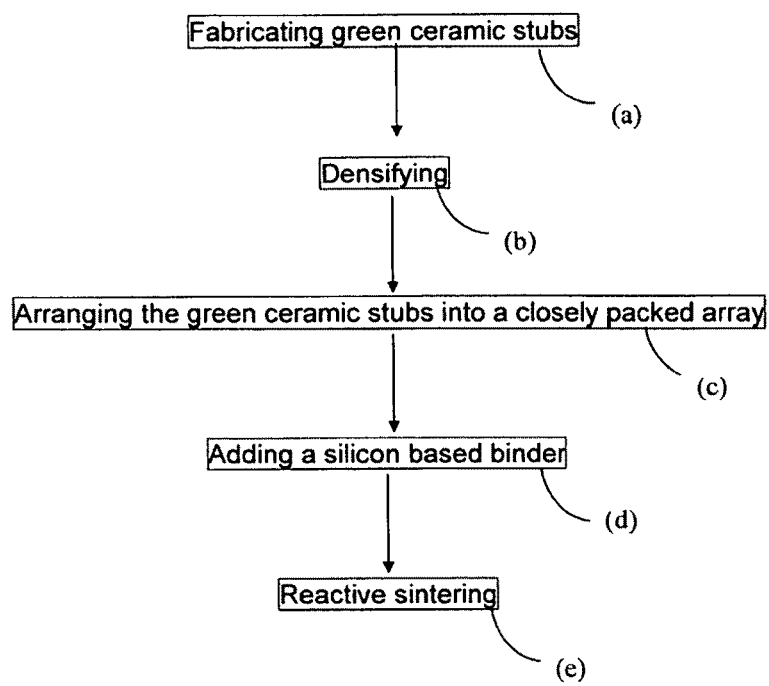
FIG. 4 is a method for fabricating the metal matrix composites in accordance with the invention.

With reference to FIG. 4, a method for fabricating metal matrix composite plates of the invention comprises the steps of:
a. Fabricating green ceramic stubs;
b. Densifying;
c. Optionally wrapping in carbon fiber;
d. Arranging the green stubs into a closely packed array;
e. Optionally adhering the green ceramic stubs with an organic solvent or binder;
f. Pyrolizing at several hundred degrees centigrade to obtain a porous green ceramic stubs;
g. Adding a silicon based metal and
h. Reactive sintering at least a temperature sufficient to melt silicon, nominally 1430° C., it being appreciated that solutes in solid solution will depress this somewhat. Preferably the fabricating temperature is about 1600° C.

Embodiments of the present invention provide a ceramic armor plate that when optimized has been found to exceed the stopping power of layers described in the prior art.

It will be appreciated that the raw materials and their proportions may vary considerably. These, the particle size, and processing conditions particularly temperature and time result in varying proportions of free silicon, perhaps with other elements in solid solution, and in various ceramic elements in varying proportions and grain size. That said, reactive sintering of ballistic ceramics is well understood, a point of novelty of the invention lies in the fabrication method and the unique resulting microstructure with ballistic, ceramic rich stubs whose pores are filled with metallic silicon, in a heterogeneous matrix phase that contains ceramic and free silicon.

By way on non-limiting example, table 1 gives one recipe and ranges of proportions in stubs and matrix material prior to and post sintering.

TABLE 1 range of proportions for relatively simple ceramic - matrix composition.

| Material | stub preform | matrix pre sinter | stub | matrix |
|---|---|---|---|---|
| Alpha SiC + B₄C | 50-80 | 0-70 | 50-80 | 0-70 |
| Free C * | 0.5-15 | 5-100 | 0 | 0 |
| Beta SiC | 0 | 0 | 1.5-40 | 0-80 |
| Si | 0 | 0 | 8-30 | 10-100 |
| Porosity | 10-50 | 10-99 | 0-3 | 0-20 |

Embodiments described herein relate to systems of closely packed ceramic shapes configured as armor plates for protecting vital organs. A ceramic composite consisting of a plurality of sub-members in a consolidating matrix is disclosed wherein the consolidating matrix itself has high ballistic protection properties and acoustic properties close to those of the sub-members. The embodiments are essentially silicon infiltrated composite ceramic shapes and this structure enables simplified production of armor fabricated therefrom. In some embodiments, high tenacity carbon fibers are positioned around the shape and consolidated to it with a matrix containing infiltrated Silicon. In this manner, a high ballistic efficiency is obtained.

Impact damage tends to be limited to single subcomponents or stubs within the composite plate. Consequently, such plates may withstand multiple impacts.

Features shown with some specific embodiments may be incorporated with other embodiments. Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

I claim:

1. An anti-ballistic a composite plate for armor comprising a plurality of hard ceramic stubs bonded together by a softer matrix that itself comprises ceramics and metal and wherein the matrix is a poly-phase matrix comprising silicon or an amalgam or alloy that substantially comprises silicon, wherein the anti ballistic plate is characterized by a high impact absorption efficiency compared to a plate comprising similar stubs within an epoxy matrix and wherein ballistic efficiency of the ceramic stubs is not substantially reduced by the bonding matrix wherein the ceramic stubs contains inclusions of a silicon rich metallic phase.

2. The composite material of claim 1 wherein the matrix comprises at least 10% metallic silicon by volume.

3. The composite plate of claim 1 wherein the matrix further includes at least one material selected from the group consisting of: Aluminum, Titanium, Iron, Boron, Nickel, Carbon and Copper.

4. The composite plate of claim 1 wherein the ceramic stubs include material selected from the group consisting of:

Boron Carbide, alpha-phase Silicon Carbide, Boron Nitride, Titanium Boride and Carbon fiber.

5. The composite plate of claim 1 wherein the ceramic stubs have cross sections having shapes selected from the list of: squares, triangles and hexagonals and said ceramic stubs tessellate to form a continuous surface.

6. The composite plate of claim 1 wherein the ceramic stubs have cross sections having shapes selected from the list of cylinders and prisms and the stubs are bonded together at points of contact in a close packed array, to form a surface with voids that are subsequently filled with the matrix.

7. The composite plate of claim 1 wherein each stub is coated with a carbon rich coil structure.

8. The composite plate of claim 1 wherein the ceramic stubs are prisms have an aspect ratio in the range of from between 0.7 and 1.6.

9. The composite plate of claim 1 further comprising a backing plate comprising at least a first ply of substantially continuous fibers in the plane of the plate.

\* \* \* \* \*